W. H. SITTS.
WATER METER.
APPLICATION FILED OCT. 14, 1909.
950,544.
Patented Mar. 1, 1910.
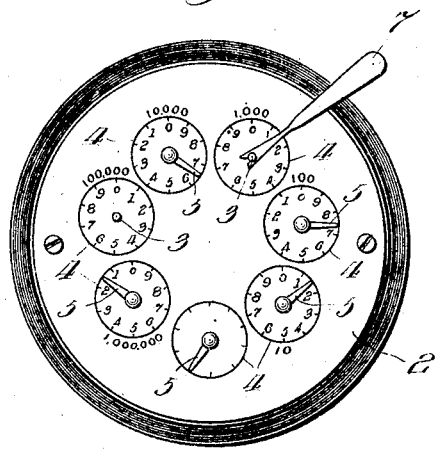
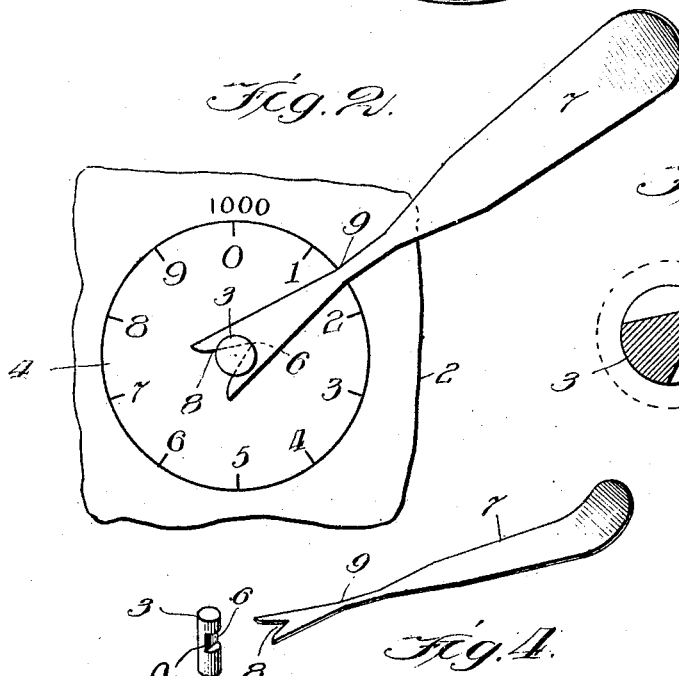
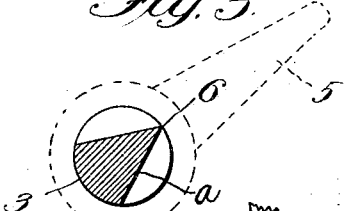
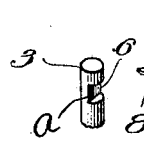
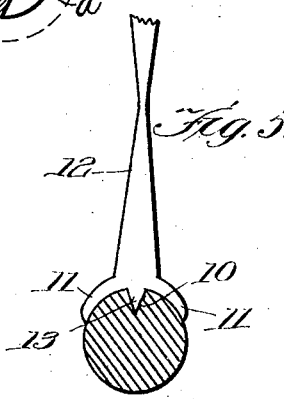
Witnesses:
Harry S. Gaither
E. A. Lundy
Inventor:
William H. Sitts
by Frank D. Thomason
atty

UNITED STATES PATENT OFFICE.

WILLIAM H. SITTS, OF CHICAGO, ILLINOIS.

WATER-METER.

950,544.  Specification of Letters Patent.  Patented Mar. 1, 1910.

Application filed October 14, 1909. Serial No. 522,586.

*To all whom it may concern:*

Be it known that I, WILLIAM H. SITTS, a citizen of the United States, residing at Chicago, in the county of Cook and State of Illinois, have invented new and useful Improvements in Water-Meters, of which the following is a full, clear, and exact description.

My invention relates to the indicating hands of dials for water-meters and similar measuring mechanisms, and its object is to absolutely prevent fraud being practiced by tearing off said hands and thereby preventing the amount indicated on the dial from being accurately read when inspected. This I accomplish by the means and in the manner hereinafter fully described, and as more particularly pointed out in the claims, reference being had to the accompanying drawings forming a part hereof, in which:—

Figure 1 is a full-size plan view of a mutilated indicator dial of a meter from which some of the hands have been removed, showing the application thereto of my improved means for correctly ascertaining the position of the indicator spindle and reading the dial. Fig. 2 is a greatly enlarged plan view of the "thousands" dial showing in detail the application of my invention. Fig. 3 is an exaggerated transverse section of one of the digit spindles taken slightly below the indicator hand (the latter being shown in dotted lines). Fig. 4 is a perspective view of the detector key or templet employed in connection with my invention. Fig. 5 is a view similar to Fig. 3 of a modified construction.

Referring to the drawings, 2 represents the multiple indicator dial or indicator plate of a suitable meter out through the center of each dial, 4, of which an indicator spindle 3 projects in the usual manner. These spindles are provided with the usual gears and pinions for properly rotating the same at the ratio of ten to one:—*i. e.* to each rotation of the "tens" spindle the "units" spindle will have revolved ten times, and the "hundreds" spindle one-tenth of a rotation and so on. The outer ends of these spindles are cylindrical and have the mounting boss of the indicator hands, 5, soldered or otherwise secured to their extensions. Just below the outer ends of these spindles and at a suitable distance away from the hands so that the solder will not run down and interfere with the same, I reduce the lateral dimensions of said spindle to form a neck, a, the outlines of which in cross section describe an acute angle, the central line of which intersecting its apex, 6, points in the same direction as the extremity of the hand secured on the end thereof.

When a hand has been removed, through accident or fraudulent intent, as illustrated, for example on the "1,000" and "100,000" dials in Fig. 1 of the drawings, it is impossible to read the dial, and in order to meet this contingency, I employ a suitably shaped key or templet, 7. The inner extremity of this key, 7, is bifurcated to form a V-shaped or angular recess, 8, the sides of which correspond to and fit the longer sides of the acute angle, 6, of said neck a. At a suitable distance from its bifurcated end the shank of this key tapers to a very narrow width so as to form a pointer, 9, as it were, terminating, preferably, at the edge of the dial, and it thereafter widens out again to provide a handle portion at the opposite end. When the bifurcations on the end of the key have been adjusted so as to fit the angular neck, a, of a spindle from the end of which the latter hand has been removed, the body of the key will extend in the same direction as its hand would have pointed had it remained in position, and the pointer will indicate the numeral to be registered, thus enabling the operator or inspector to correctly read the meter and accurately ascertain the amount measured thereby.

While I have shown and described a cut-away portion or neck on the spindle and the bifurcated end of the key as triangular in shape, it, of course, will be obvious that various other forms or designs capable of contributing to the same result may be employed with equal success, and I do not wish to be understood as limiting myself to any particular shape or figure, and any such changes I desire to include within the scope of my claims. For example, as shown in Fig. 5 the spindle may have a small hole 10 tapped radially in the outer portion near its end. The key for use in this connection conforms to the shape of a "spanner" with arms projecting from either side of the pointer 12, and corresponds in curvature to the sides of the spindle. Projecting radially from the center of the arc formed by the arms 11, is a small pin 13 that is adapted, when the device is in use, to be seated in the hole 10 of the spindle. The remainder of the length of the key is the same as that hereinbefore described and as shown in Figs. 1, 2 and 4 of the drawings.

What I claim as new is:—

1. A meter comprising a register the face of which is provided with a dial having an index hand, and a spindle to which said hand is secured, the outer portion of which nearest said hand is altered, in combination with a key one extremity of which is provided with a recess the sides of which correspond to and fit the altered portion of said spindle.

2. A meter comprising a register the face of which is provided with a dial having an index hand, and a spindle to which said hand is secured, the end of which nearest said hand is altered, in combination with a key one extremity of which is bifurcated and the side edges of said bifurcation shaped to correspond with and fit the altered portion of said spindle.

3. A meter comprising a register the face of which is provided with a dial having an index hand, and a spindle to which said hand is secured, the outer portion of which nearest said hand is provided with a neck, in combination with a key one extremity of which is provided with a recess the sides of which correspond to and fit the neck portion of said spindle.

4. A meter comprising a register the face of which is provided with a dial having an index hand, and a spindle to which said hand is secured, the end of which nearest said hand is provided with a neck, in combination with a key one extremity of which is bifurcated and the side edges of said bifurcation shaped to correspond with and fit the neck portion of said spindle.

5. A meter comprising a register the face of which is provided with a dial having an index hand, and a spindle to which said hand is secured, the outer portion of which nearest said hand is provided with a substantially triangular-shaped neck the apex of which points in the same direction as said hand, in combination with a key one extremity of which is provided with a recess the sides of which correspond to and fit the triangular-shaped neck portion of said spindle.

6. A meter comprising a register the face of which is provided with a dial having an index hand, and a spindle to which said hand is secured, the outer portion of which nearest said hand is provided with a substantially triangular-shaped neck the apex of which points in the same direction as said hand, in combination with a key one extremity of which is bifurcated and the side edges of said bifurcation shaped to correspond with and fit the triangular shaped neck portion of said spindle.

7. A meter comprising a register the face of which is provided with a dial having an index hand, and a spindle to which said hand is secured, and having the end nearest said hand altered, in combination with a key having one extremity provided with a recess adapted to fit the altered portion of said spindle and point said key in the same direction as said hand.

8. A meter comprising a register the face of which is provided with a dial having an index hand, and a spindle to which said hand is secured, and having the end nearest said hand altered, in combination with a key, a portion of the shank of which is tapered and having one extremity provided with a recess adapted to fit the altered portion of said spindle and point, the tapered portion of said key in the same direction as said hand.

In witness whereof I have hereunto set my hand this 9th day of October, 1909.

WILLIAM H. SITTS.

Witnesses:
FRANK D. THOMASON,
E. K. LUNDY.